US011426841B2

(12) United States Patent
Ross (10) Patent No.: US 11,426,841 B2
(45) Date of Patent: Aug. 30, 2022

(54) INTERNAL GEAR RETENTION MECHANISM (71) Applicant: Snap-on Incorporated, Kenosha, WI (US)

(72) Inventor: David T. Ross, Antioch, IL (US)

(73) Assignee: Snap-on Incorporated

( * ) Notice: Subject to any disclaimer, the term of this patent is extended or adjusted under 35 U.S.C. 154(b) by 565 days.

(21) Appl. No.: 16/519,926

(22) Filed: Jul. 23, 2019

(65) Prior Publication Data

US 2021/0023682 A1 Jan. 28, 2021

(51) Int. Cl.
*B25B 13/46* (2006.01)
*F16H 31/00* (2006.01)
*F16H 57/00* (2012.01)

(52) U.S. Cl.
CPC ......... *B25B 13/463* (2013.01); *F16H 31/002* (2013.01); *F16H 57/00* (2013.01)

(58) Field of Classification Search
CPC .............. B25B 13/463; B25B 23/0035; B25B 23/0007; F16H 31/002; F16H 57/00
USPC ......................................................... 81/63.2
See application file for complete search history.

(56) References Cited

U.S. PATENT DOCUMENTS

| 4,277,990 A | 7/1981 | Hall |
| 4,336,728 A | 6/1982 | Deibert |
| 4,592,255 A | 6/1986 | Mayer |
| 4,869,138 A | 9/1989 | Farris |
| 4,898,052 A | 2/1990 | Kang |
| 4,967,624 A | 11/1990 | Farris |
| 5,157,994 A | 10/1992 | Krivec |
| 5,231,903 A | 8/1993 | Bockman, Jr. |
| 5,626,061 A | 5/1997 | Whitley |
| 6,109,141 A | 8/2000 | Nurmi |
| 6,209,423 B1 | 4/2001 | Shiao |
| 6,431,031 B1 | 8/2002 | Hu |
| 6,457,387 B1 | 10/2002 | Hu |
| 6,543,316 B2 | 4/2003 | Daigle et al. |
| 6,568,299 B2 | 5/2003 | Hu |
| 6,805,028 B1 | 10/2004 | Chang |
| 6,955,104 B2 | 10/2005 | Hu |

(Continued)

FOREIGN PATENT DOCUMENTS

| CN | 201529958 U | 7/2010 |
| CN | 101797731 A | 8/2010 |

(Continued)

OTHER PUBLICATIONS

UK Combined Search and Examination Report for Application No. GB2001750.5 dated Jul. 21, 2020, 6 pages.

(Continued)

*Primary Examiner* — Joseph J Hail
*Assistant Examiner* — Robert C Moore
(74) *Attorney, Agent, or Firm* — Seyfarth Shaw LLP (57) ABSTRACT A retaining structure for a drive gear of a ratchet wrench. The drive gear has a partial internal bore that receives a gear retainer that is coupled to the tool housing via screws. The gear retainer can further be rotatably coupled to the drive gear to retain the drive gear within the head of the tool without requiring a cover plate. By potentially avoiding the cover plate, the ratchet wrench head can be thinner compared to conventional ratchet wrenches and the ratchet wrench seal can be improved.

14 Claims, 6 Drawing Sheets

(56) References Cited

U.S. PATENT DOCUMENTS

| | | |
|---|---|---|
| 7,836,798 B2 | 11/2010 | Hu |
| 8,210,073 B2 | 7/2012 | Hu |
| 8,250,947 B2 | 8/2012 | Hu |
| 8,297,152 B2 | 10/2012 | Hu |
| 8,499,666 B2 | 8/2013 | Hopper et al. |
| 8,720,308 B2 | 5/2014 | Hopper et al. |
| 8,720,309 B2 * | 5/2014 | Chen .................. B25B 13/465 81/63 |
| 9,038,507 B2 | 5/2015 | Thompson et al. |
| 9,254,557 B2 | 2/2016 | Hu |
| 10,118,279 B2 | 11/2018 | Hu |
| 10,800,011 B2 | 10/2020 | Herisse |
| 2004/0016322 A1 | 1/2004 | Hu |
| 2004/0055423 A1 | 3/2004 | Hu |
| 2004/0074343 A1 * | 4/2004 | Hsieh .................. B25B 13/463 81/63.2 |
| 2004/0221687 A1 * | 11/2004 | Hsien .................. B25B 13/463 81/63.2 |
| 2005/0011314 A1 | 1/2005 | Chen |
| 2014/0083259 A1 | 3/2014 | Anderson et al. |
| 2016/0229042 A1 * | 8/2016 | Shyu .................. B25B 23/0035 |
| 2018/0015595 A1 | 1/2018 | Lai |
| 2018/0272505 A1 | 9/2018 | Ross |
| 2018/0339403 A1 | 11/2018 | Chen |
| 2018/0361545 A1 | 12/2018 | Ross et al. |
| 2019/0091839 A1 | 3/2019 | Ross |

FOREIGN PATENT DOCUMENTS

| | | |
|---|---|---|
| CN | 104760014 A | 7/2015 |
| CN | 204819290 U | 12/2015 |
| CN | 205614559 U | 10/2016 |
| CN | 207824766 U | 9/2018 |
| CN | 109571336 A | 4/2019 |
| CN | 208826469 U | 5/2019 |
| CN | 209125705 U | 7/2019 |
| JP | 11165271 | 6/1999 |
| JP | 2002052478 A | 2/2002 |
| TW | 571874 U | 1/2004 |
| TW | M254304 U | 1/2005 |
| TW | 200536672 A | 11/2005 |
| TW | 200635712 A | 10/2006 |
| TW | M390841 U | 10/2010 |
| TW | M445476 U | 1/2013 |
| TW | M499986 U | 5/2015 |
| TW | I522210 B | 2/2016 |
| TW | M521519 U | 5/2016 |
| TW | M526465 U | 8/2016 |
| TW | I627027 B | 6/2018 |
| TW | M566132 U | 9/2018 |
| TW | M576088 U | 4/2019 |

OTHER PUBLICATIONS

Examination Report for Application No. 2020200671 dated Nov. 6, 2020, 6 pages.
United Kingdom Office Action for corresponding Application No. GB2001750.5 dated Aug. 6, 2021.
Taiwan Office Action for Application No. 11020101300 dated Feb. 2, 2021, 4 pages.
Canadian Office Action for Application No. 3,076,120 dated Apr. 29, 2021, 3 pages.
Chinese Office for corresponding CN Application No. 202010203523.1, dated Nov. 22, 2021, 6 pages.

* cited by examiner

FIG. 6
PRIOR ART ns. More particularly, the present invention relates to a
INTERNAL GEAR RETENTION MECHANISM

TECHNICAL FIELD OF THE INVENTION

The present invention relates generally to ratchet mechanisms. More particularly, the present invention relates to a tool having an internal gear retainer for a drive gear of a ratchet mechanism.

BACKGROUND OF THE INVENTION

Ratchet wrenches are common hand tools used to apply torque to work pieces. Ratchet wrenches include a pawl mechanism that allows the tool to torque a work piece in a first rotational direction by rotating the tool in that rotational direction, and then return the tool to its original position by rotating the tool in a second rotational direction opposite the first rotational direction. The pawl mechanism engages a drive gear to "lock" the gear to impart the torque in the first rotational direction, but allows the pawl to rotate relative to the drive gear in the second rotational direction. A reversing lever can reverse which of the first and second rotational directions applies torque to the work piece, for example, if the work piece is left hand threaded or if the user is using the tool to remove the work piece from its position.

Figure 6:
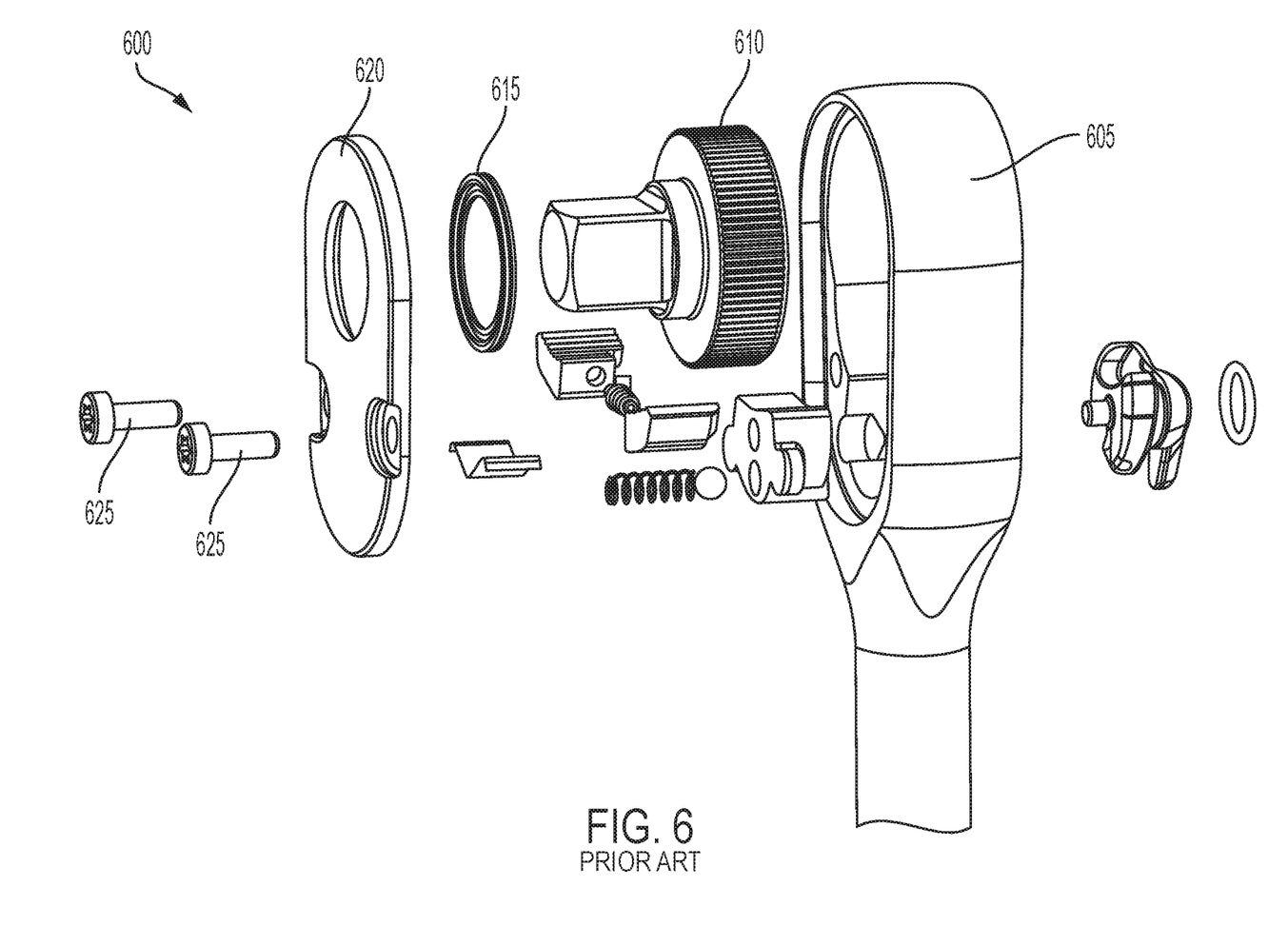
FIG. 6 is a front perspective exploded view of a prior art tool.

Conventional ratchet wrenches use cover plates to enclose the drive gear within the tool head. For example, as shown in FIG. 6, a prior art tool 600 can include a head 605 and a drive gear 610 located within the head 605. A seal 615 can be sandwiched between a cover plate 620 and the drive gear 610 to provide a seal to prevent debris from entering the internal cavity of the head 605, and for preventing lubricant from escaping the head 605. Screws 625 can then secure the cover plate 620 to the head 605.

The drive gear 610 can experience various directional loads during use, for example an axial load. In such circumstances the drive gear 610 can cause the cover plate 620 to deflect and therefore displace the seal 615 from its intended location. This deflection causes debris to enter the cavity of the head 605 and lubricant to escape the cavity.

SUMMARY OF THE INVENTION

The present invention broadly comprises a ratchet wrench mechanism including a drive gear with a partial internal bore that receives a gear retainer to retain the gear within the head of the ratchet wrench. The gear retainer can be attached to the housing via screws and rotatably coupled to the drive gear. By placing the gear retainer within the partial bore, the cover plate can optionally be eliminated, and the thickness of the ratchet wrench head can be reduced compared to conventional ratchet wrenches.

In particular, the present invention broadly comprises a tool including a head having an internal housing disposed at a first head side opposite a second head side, and further including a passage extending from the first head side to the second head side. The tool further includes a drive gear disposed within the head and having a lug extending from a first gear side and a partial bore defined within a second gear side opposite the first gear side, a gear retainer disposed at least partially within the partial bore and being rotatably coupled to the drive gear, the gear retainer including a screw hole defined therein, and a screw extending through the passage and coupling to the screw hole.

The present invention also broadly comprises a retaining mechanism for a tool having a head with an internal housing disposed at a first head side opposite a second head side and a passage defined therebetween. The retaining mechanism includes a drive gear disposed within the head and having a lug extending from a first gear side and a partial bore defined within a second gear side opposite the first gear side, a gear retainer disposed at least partially within the partial bore and being rotatably coupled to the drive gear, the gear retainer including a screw hole defined therein, and a screw extending through the passage and coupling to the screw hole.

The present invention also broadly comprises a method of assembling a tool including providing a head having an internal housing disposed at a first head side opposite a second head side, and further including a passage extending from the first head side to the second head side; inserting into the housing a drive gear having a lug extending from a first gear side and a partial bore defined within a second gear side opposite the first gear side; coupling a gear retainer to the drive gear at least partially within the partial bore, the gear retainer being rotatably coupled to the drive gear and including a screw hole defined therein; and inserting screw through the passage and coupling the screw to the screw hole.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a retaining mechanism for a ratchet wrench drive gear. The drive gear has a partial internal bore that receives a gear retainer. The gear retainer can be attached to a housing via screws and can be rotatably coupled to the drive gear to retain the drive gear within the head of the tool. By placing the gear retainer within the partial bore, the cover plate can optionally be eliminated, and the thickness of the ratchet wrench head can be reduced compared to conventional ratchet wrenches.

Referring to FIGS. 1-5, a tool 100 can include a head 105 having first 105A and second 105B opposing head sides, and a handle 110 extending from the head 105. A housing 112 can be defined within the head 105, and the housing 112 can receive a drive gear 115 having a drive body 117 and lug 120. The drive gear 115 can include a lug 120 at a first gear side 115A and a partial bore 125 defined within a second gear side 115B opposite the first gear side 115A. The drive body 117 can interact with one or more pawls 127 to apply torque to work pieces in a well-known manner within the ratchet wrench art.

A seal 130 can be provided on the face of the drive body 117 proximate the lug 120. The seal can be a conventional O-ring, elastomeric gasket, or any other air or water seal known in the art. The seal 130 can form a seal between the drive gear 115 and the housing of the head 105 of the tool 100 to substantially prevent lubricant from escaping the tool 100 and to substantially prevent debris or contamination from entering the internal cavity of the tool 100.

A gear retainer 135 can be disposed at least partially within the partial bore 125 of the drive gear 115 to retain the drive gear 115 within the head 105 of the tool 100. For example, the gear retainer 135 can include a rim 140 and screw holes 145. The rim 140 can be located within the partial bore 125 and the screw holes 145, which can include internal threads, can provide a threadable connection point for corresponding threads of screws 147 inserted from the exterior of the tool 100 through passages 149 defined within the head 105. In this manner, the screws 147 can be inserted into the passages 149 and can couple with the screw holes 145 to secure the gear retainer 135 against the head 105 and rotatably couple the gear retainer 135 against the drive gear 115.

Figure 4:
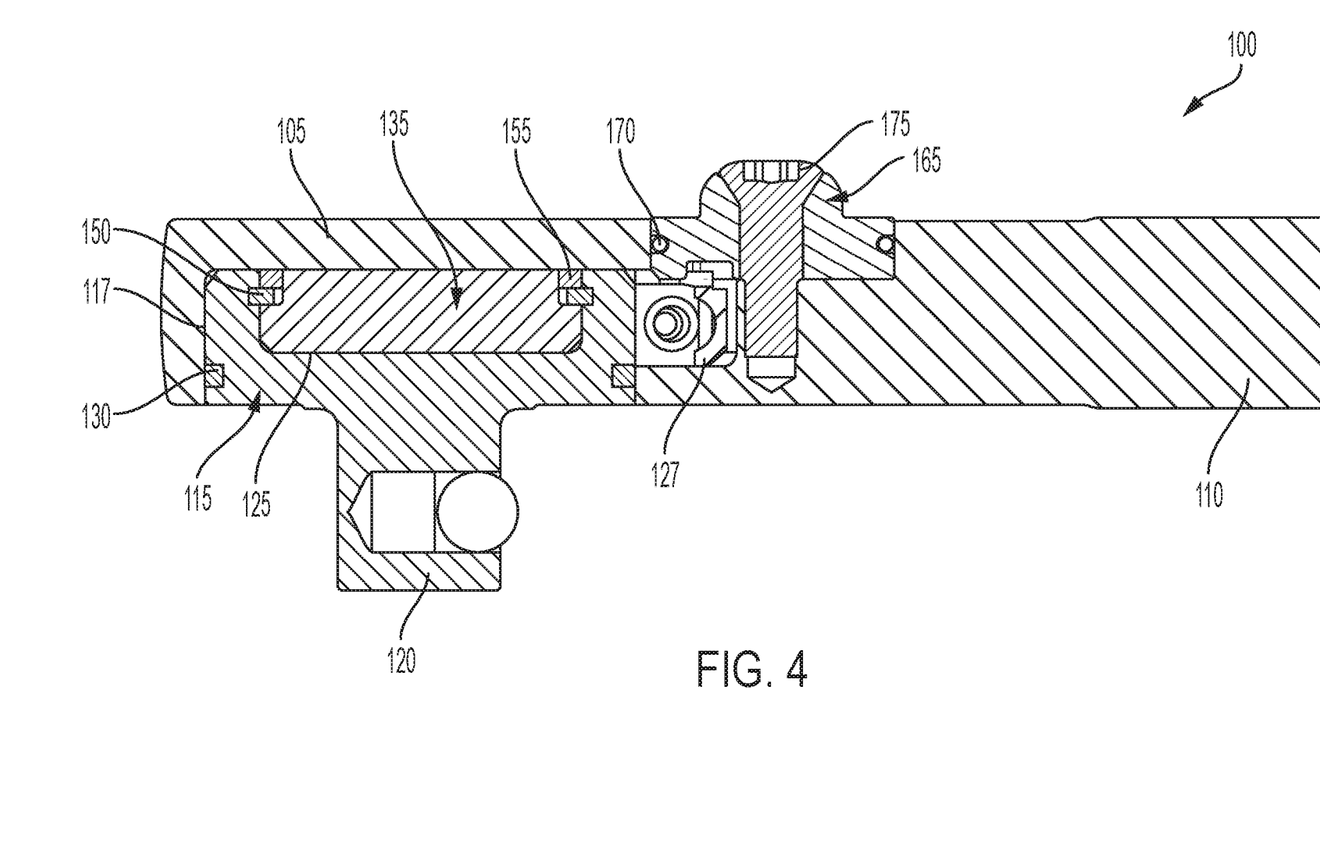
FIG. 4 is a side cross sectional view of the tool of FIG. 3, taken along line 4 in FIG. 3.
Figure 5:
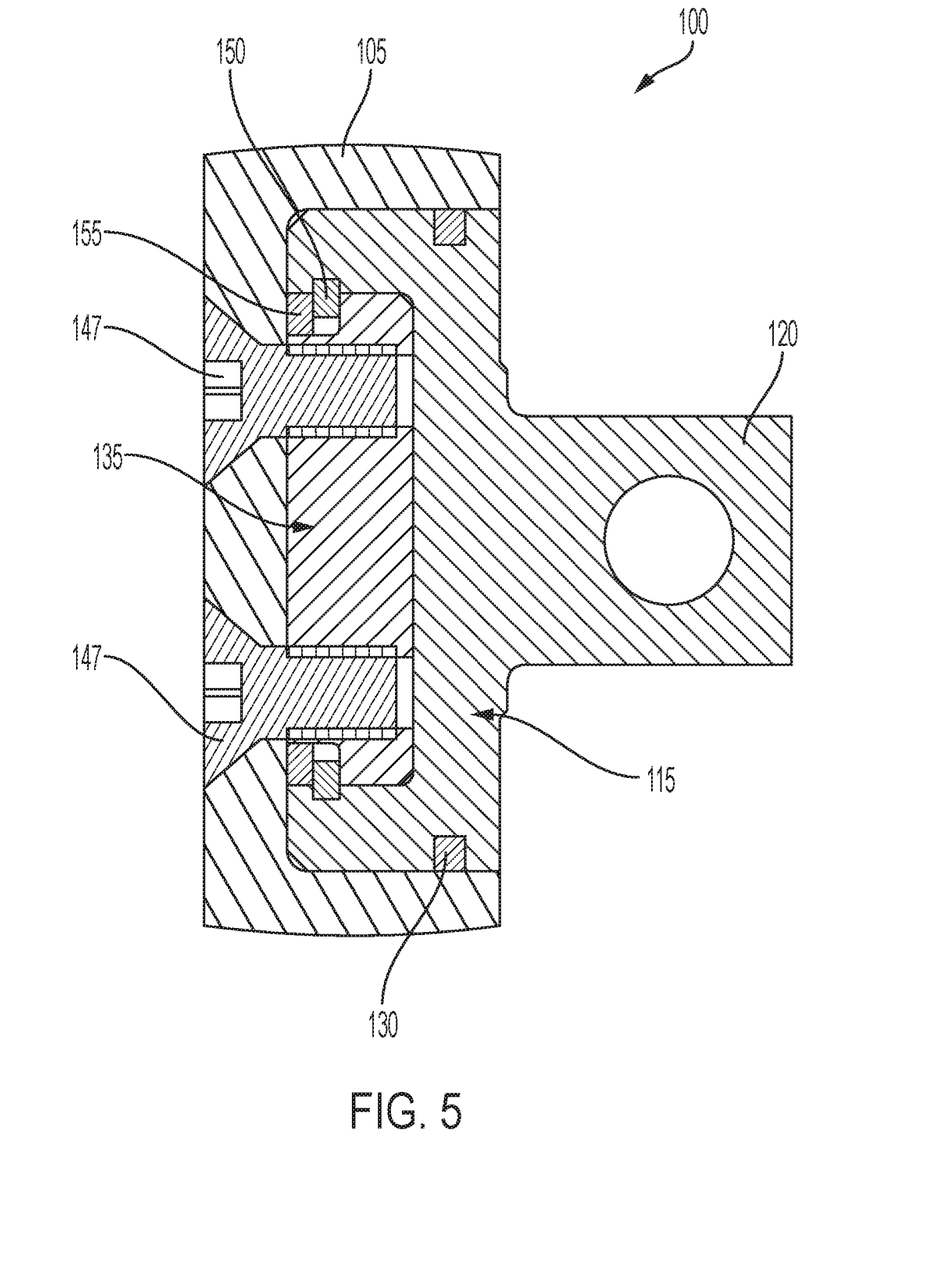
FIG. 5 is a side cross sectional view of the tool FIG. 3, taken along line 5 in FIG. 3.

As best shown in FIGS. 4 and 5, the housing of the head 105 prevents the drive gear 115 from escaping at a first end of the head 105, and a retainer ring 150 can couple the drive gear 115 to the gear retainer 135 to prevent the drive gear 115 from escaping from a second end of the head 105. The retainer ring 150 extends within a notch of the gear retainer 135 and also within a notch of the drive gear 115 to allow rotatable movement of the drive gear 115 about the gear retainer 135. As discussed above, the gear retainer 135 is anchored to the head 105 via the screws 147 to provide a suitable connection point for the retainer ring 150 to couple the drive gear 115 to the gear retainer 135. A support ring 155 can space the retainer ring 150 from the internal housing of the head 105 to allow rotational movement of the drive gear 115 about the head 105.

Figure 1:
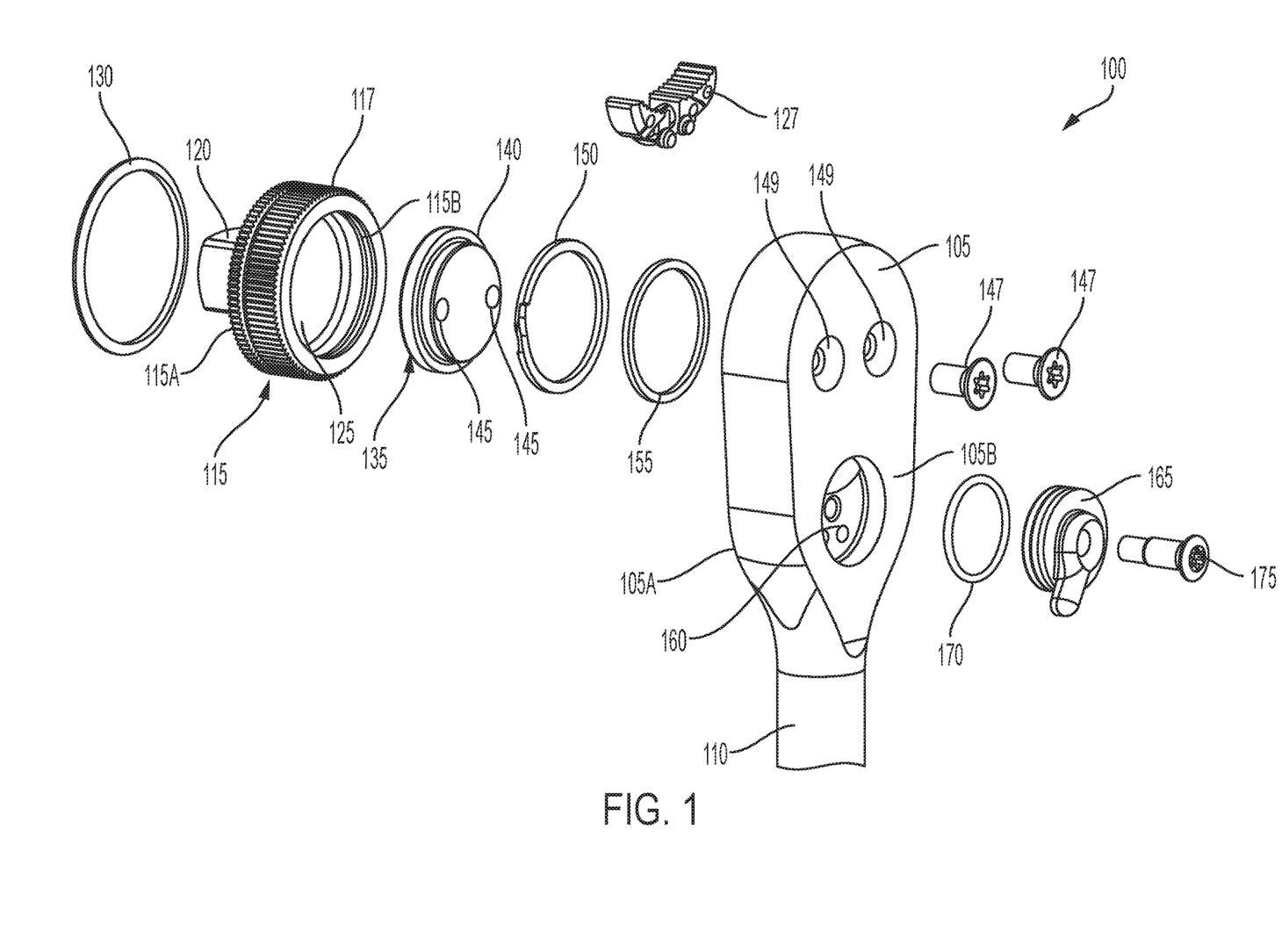
FIG. 1 is a front perspective exploded view of a tool according to an embodiment of the present invention.
Figure 2:
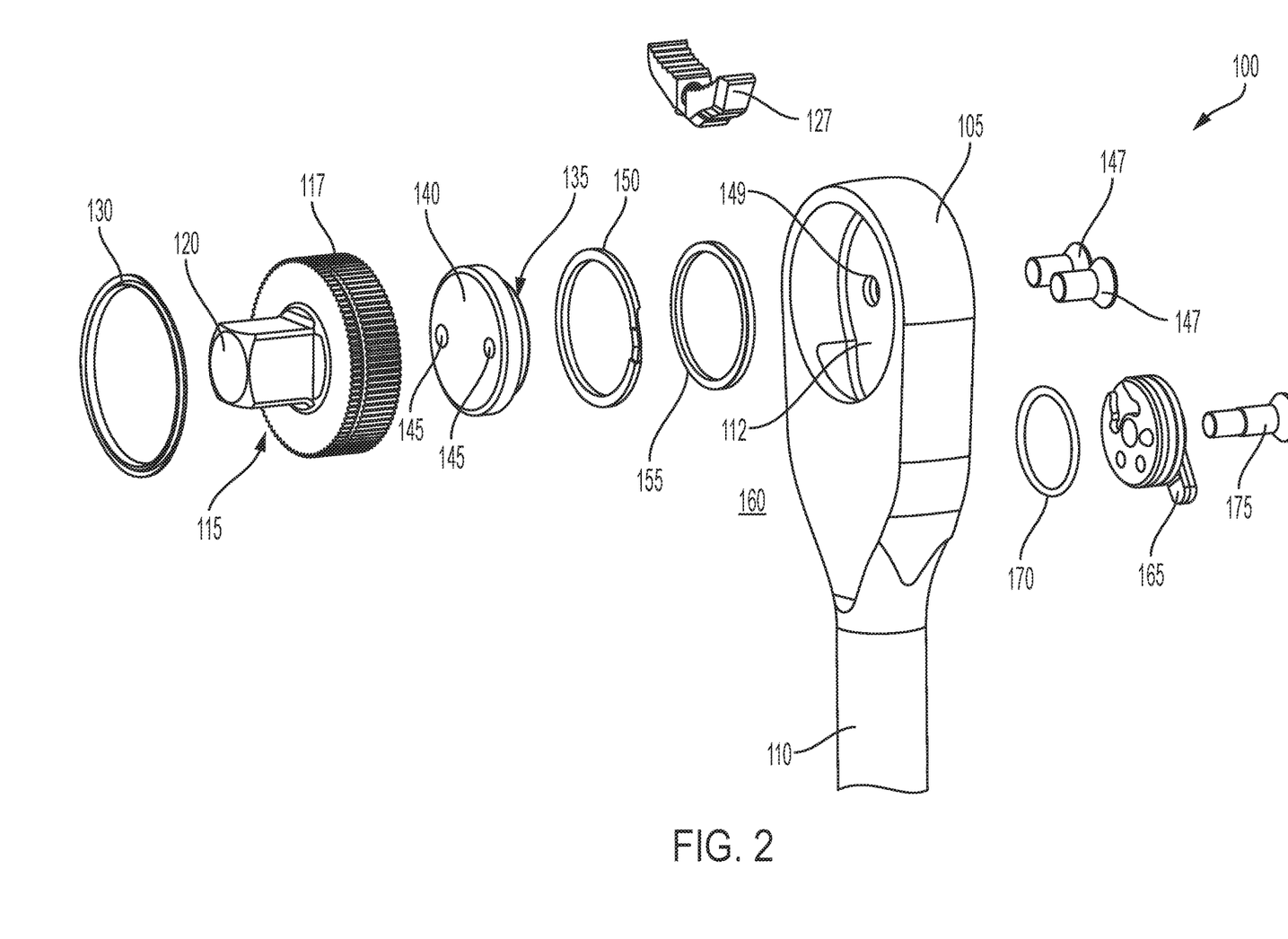
FIG. 2 is a rear perspective exploded view of a tool according to an embodiment of the present invention.
Figure 3:
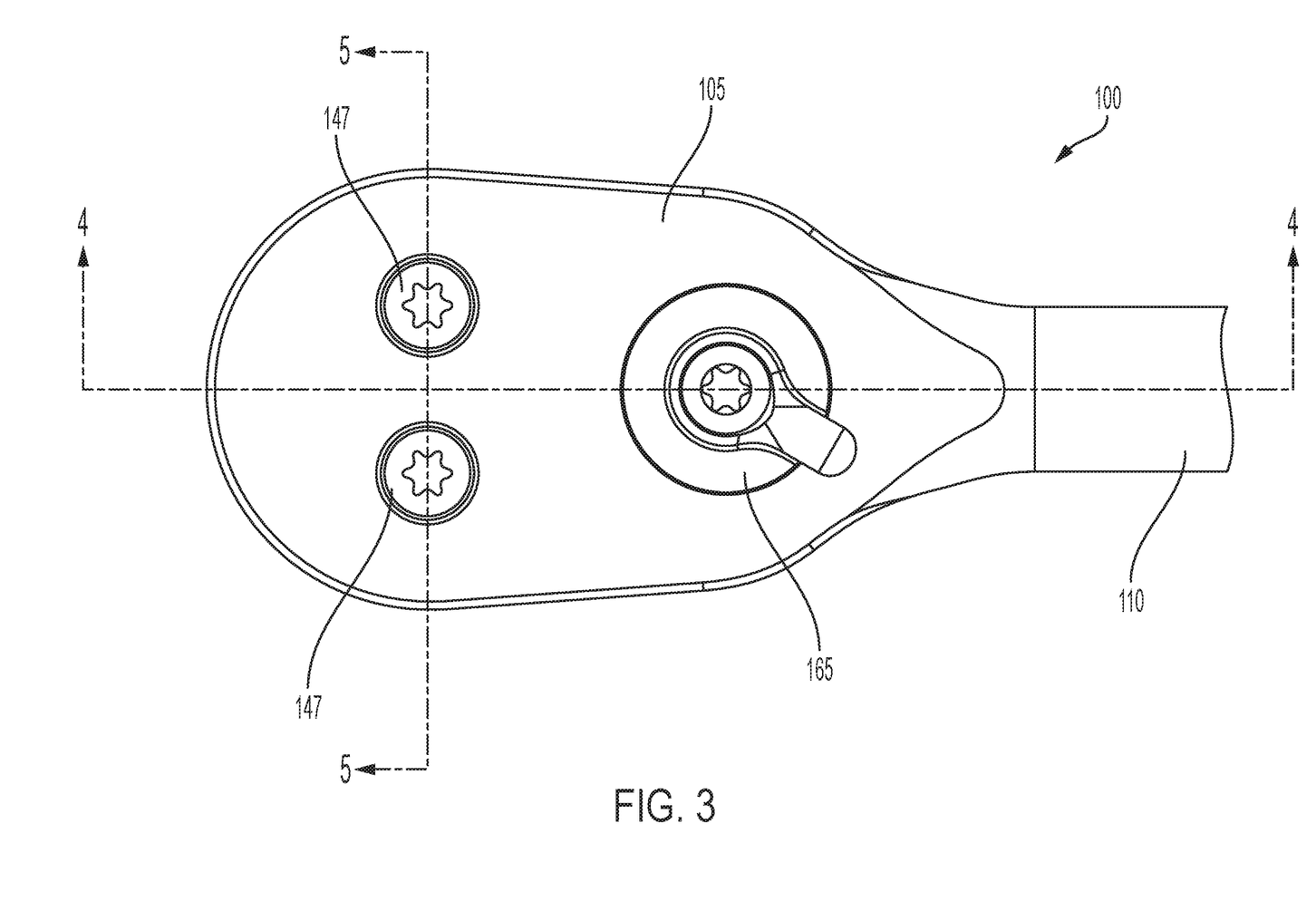
FIG. 3 is a top view of a tool according to at least one of the presently disclosed embodiments.

A cutout 160 within the head 105 can provide a space for receiving a reversing lever 165. As shown, the cutout 160 can receive a lever ring 170 that spaces the reversing lever 165 from the housing of the tool 100, and can further receive a lever screw 175 inserted into a hole of the reversing lever 165 to couple the reversing lever to the housing of the head 105. The reversing lever 165 can then operate a pawl system to allow the user to choose the drive direction of the tool 100, as is well known in the art.

The tool 100 can include a type of ratchet known as a dual-pawl ratchet mechanism allowing a user to selectively determine a torque direction. More specifically, the pawls 127 can be selectively engaged with the drive gear 115, whereas the drive gear 115 can be operatively engaged with the work piece to apply torque to the work piece. When a first of the pawls 127 is engaged with the drive gear 115, torque drive is permitted with rotation of the tool 100 in a first rotational drive direction while slippage or ratcheting occurs with rotation of the tool 100 in a second rotational direction opposite the first rotational direction. Conversely, when a second of the pawls 127 is engaged with the drive gear 115, the first of the pawls 127 moves out of engagement with the drive gear 115, and torque drive is permitted with rotation of the tool 100 in the second rotational direction while slippage or ratcheting occurs in the first rotational direction.

As described, the reversing lever 165 is configured to select one of the pawls 127 to thereby select the desired rotational direction in which the tool 100 can apply torque. For example, the reversing lever 165 can include hooks that engage the pawls 127 and cause the engaging pawl to then engage the drive gear 115. In doing so, the reversing lever 165 will cause the other of the pawls 127 to disengage from the drive gear 115. The end result is that the engaging pawl will cause its teeth to meshingly engage with the teeth of the drive gear 115, allowing the engaging pawl to slip when the handle 110 is rotated in a first rotational direction and to grip the drive gear 115 to allow torque to be applied in a second rotational direction opposite the first rotational direction.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a head with an internal housing disposed at a first head side opposite a second head side, and a drive gear disposed within the head with a lug extending from a first gear side, the tool comprising:
   a passage extending from the first head side to the second head side;
   a partial bore having a substantially cylindrical shape and defined within a second gear side opposite the first gear side;
   a gear retainer disposed at least partially within the partial bore and rotatably coupled to the drive gear, the gear retainer including a screw hole; and
   a screw extending through the passage threadably engaging the screw hole.

2. The tool of claim 1, further comprising a seal disposed proximate the first gear side.

3. The tool of claim 1, further comprising a retainer ring disposed proximate the second gear side and coupling the drive gear to the gear retainer.

4. The tool of claim 3, further comprising a support ring disposed between the retainer ring and an internal wall of the internal housing.

5. The tool of claim 1, further comprising a cutout defined within the second head side and adapted to receive a reversing lever.

6. The tool of claim 5, further comprising a pawl operable by the reversing lever and engageable with the drive gear.

7. A retaining mechanism for a tool having a head with an internal housing disposed at a first head side opposite a second head side and a passage defined therebetween, the retaining mechanism comprising:
  a drive gear disposed within the head and having a lug extending from a first gear side and a partial bore having a substantially cylindrical shape and defined within a second gear side opposite the first gear side;
  a gear retainer disposed at least partially within the partial bore and rotatably coupled to the drive gear, the gear retainer including a screw hole defined therein; and
  a screw extending through the passage and threadably engaging the screw hole.

8. The retaining mechanism of claim 7, further comprising a seal disposed proximate the first gear side.

9. The retaining mechanism of claim 7, further comprising a retainer ring disposed proximate the second gear side and coupling the drive gear to the gear retainer.

10. The retaining mechanism of claim 9, further comprising a support ring disposed between the retainer ring and an internal wall of the internal housing.

11. A method of assembling a tool including a head having an internal housing disposed at a first head side opposite a second head side, and a passage extending from the first head side to the second head side, the method comprising:
  inserting into the internal housing a drive gear having a lug extending from a first gear side and a partial bore having a substantially cylindrical shape and defined within a second gear side opposite the first gear side;
  rotatably coupling a gear retainer to the drive gear, the gear retainer disposed at least partially within the partial bore and includes a screw hole defined therein; and
  inserting a screw through the passage and threadably engaging the screw with the screw hole.

12. The method of claim 11, further comprising disposing a seal proximate the first gear side.

13. The method of claim 11, further comprising disposing a retainer ring proximate the second gear side and coupling the drive gear to the gear retainer.

14. The method of claim 13, further comprising disposing a support ring between the retainer ring and an internal wall of the internal housing.

* * * * *